United States Patent [19]

Cameron et al.

[11] Patent Number: 5,350,728

[45] Date of Patent: * Sep. 27, 1994

[54] METHOD OF PREPARING A SOLID MASS FOR MERCURY RECOVERY

[75] Inventors: Charles Cameron, Paris; Philippe Courty, Houilles; Georges Berrebi, Bourge les Valence; Raymond Roumieu, Valence; Hans Rabehasaina, Loriol sur Drome; Francois Eschard, Le Vesinet, all of France

[73] Assignee: Institut Francais du Petrole and Europeene de Retraitment de Catalyseurs (Eurecat), La Voulte sur Rhone, France

[*] Notice: The portion of the term of this patent subsequent to Sep. 14, 2010 has been disclaimed.

[21] Appl. No.: 92,924

[22] Filed: Jul. 19, 1993

Related U.S. Application Data

[63] Continuation of Ser. No. 784,216, Oct. 30, 1991, abandoned.

[30] Foreign Application Priority Data

Oct. 30, 1990 [DE] Fed. Rep. of Germany ........... 13597

[51] Int. Cl.$^5$ ..................... B01J 20/08; B01J 20/12; B01J 20/16; B01J 20/20
[52] U.S. Cl. ..................... 502/415; 95/134; 423/210; 502/60; 502/77; 502/79; 502/80; 502/216; 502/407; 502/412; 502/413; 502/414; 502/417
[58] Field of Search ............... 502/407, 412, 413, 415, 502/417, 216, 60, 77, 79, 80, 414

[56] References Cited

U.S. PATENT DOCUMENTS

| | | | |
|---|---|---|---|
| 4,094,777 | 6/1978 | Sugier | 55/74 |
| 4,222,897 | 9/1980 | Rollmann | 502/400 |
| 4,474,896 | 10/1984 | Chao | 55/74 |
| 4,902,662 | 2/1990 | Toulhoat et al. | 502/216 |
| 4,909,926 | 3/1990 | Yah | 502/38 |
| 5,041,404 | 8/1991 | Seamans et al. | 502/220 |
| 5,245,106 | 9/1993 | Cameron et al. | 502/216 |

FOREIGN PATENT DOCUMENTS 0107582 5/1984 European Pat. Off. ............ 502/216

*Primary Examiner*—Paul E. Konopka
*Attorney, Agent, or Firm*—Miller, White, Zelano & Branigan

[57] ABSTRACT

A solid mass for the recovery of mercury, comprising a solid mineral support or dispersant, essentially copper and sulphur at least partly in the form of copper sulfide is produced by the following stages:

a) at least one copper compound other than a sulphide is incorporated into a solid mineral dispersant or carrier, b) the product obtained in stage (a) is calcined in order at least partly to convert the copper compound or compounds which it contains into copper oxide (CuO and/or $Cu_2O$), c) the product obtained in stage (b) or in stage (a) if there has not been a stage (b) is brought into contact with elementary sulphur, d) the product resulting from stage (c) referred to as the precursor, is subjected to a thermal treatment in a non-oxidizing atmosphere and accompanied by gas scavenging, to a temperature and for a sufficient time to allow the formation of sulphide of the metal(s) present.

19 Claims, No Drawings

METHOD OF PREPARING A SOLID MASS FOR MERCURY RECOVERY

This application is a continuation, of application Ser. No. 07/784,216, filed Oct. 30, 1991, now abandoned.

BACKGROUND OF THE INVENTION

The present invention relates to a solid mass for mercury recovery, characterised by its method of preparation. This solid mercury recovery mass contains a solid mineral dispersant or support, copper and sulphur combined at least partially in the form of copper sulphide.

The present invention likewise has as an object a method of preparing a precursor of a solid mercury recovery mass and also the precursor obtained by the said method.

The solid masses of the present invention may be variously termed: absorption, recovery, extraction or trapping masses.

U.S. Pat. No. 4,094,777 describes a method of producing a mercury recovery mass comprising the incorporation of a copper compound into a mineral support followed by sulphuration at a temperature below 300° C.

Sulphuration according to the method described in this patent is carried out by means of a gaseous agent, for example hydrogen sulphide, or a solution of a mineral sulphide in water or in an organic solvent, for example an aqueous solution of sodium sulphide, potassium sulphide or ammonium sulphide.

The masses obtained exhibit high activity and are relatively inexpensive. However, the preparation of these recovery masses does have a number of substantial drawbacks.

Thus, when sulphuration is carried out by means of gaseous hydrogen sulphide ($H_2S$), obtaining a recovery mass having sufficient activity normally requires working at elevated temperatures, for example around 200° C., which is a penalty in energy and equipment cost. Furthermore, $H_2S$ is a toxic and malodorous gas.

The use of sulphide solution, for example an aqueous solution of ammonium sulphide, makes it possible to work at a relatively low temperature for example between 0° and 100° C. However, ammonium sulphide is a toxic compound which is also readily decomposable, thereby complicating its use.

The use of other sulphides (of sodium . . . ) brings additional cations into the mass, which is undesirable.

According to patent application EP-A-107582, a mercury recovery mass is prepared by impregnation of a carrier by means of an organic solution of elementary sulphur or an aqueous solution of a sulphur compound which is decomposable into elementary sulphur at a temperature below 150° C.

After drying and volatilisation of the organic compound or after the aforesaid decomposition, a carrier or support is obtained with a dispersion of non-molten sulphur in the free state.

U.S. Pat. No. 4,474,896 describes a mercury recovery mass obtained by bringing into contact a carrier impregnated with a metallic cation capable of forming an insoluble polysulphide, with a mixture of polysulphide and sulphide.

In the tests described, $CaCl_2$ supports treated by elementary sulphur have been prepared. The results obtained in the processing of fluids containing a mercury charge are poor: the effluent displays excessive quantities of mercury.

SUMMARY OF THE INVENTION

It has now been discovered that it is possible to obtain a solid mercury recovery mass based on copper sulphide and which is very effective, has an improved effective life and which costs less to produce, the said mass being obtained by treating with elementary sulphur a support charged with copper oxide followed by activation, To be more precise, the method of preparing a solid mercury recovery mass according to the present invention comprises the following stages:

a) at least one copper compound other than a sulphide is incorporated into a solid mineral dispersant or support, b) on the hypothesis that the said compound is not a copper oxide, the product obtained in stage (a) is calcined to convert the copper compound or compounds which it contains at least partially into copper oxide ($CuO$ and/or $Cu_2O$), c) the product obtained in stage (b) or in stage (a) if there has not been a stage (b) is brought into contact with elemental sulphur, d) the product obtained in stage (c) is subjected to a heat treatment in a non-oxidising atmosphere accompanied by scavenging with gas, at a temperature and for a period which are sufficient to allow the formation of sulphide of the metal or metals present.

The solid mineral dispersants or supports are normally chosen from the group formed by carbon, activated carbon, coke, silica, silicon carbide, silica gel, synthetic or natural silicates, clays, diatomaceous earths, fuller's earths, kaolin, bauxite, inorganic refractory oxides such as for example alumina, titanium oxide, zirconia, magnesia alimina-silicas, silica-magnesia and silica-zirconia, mixtures of alumina and boron oxide, the aluminates, silico-aluminates, the crystalline, synthetic or natural zeolitic alumino-silicates, for example the mordenites, faujasites, offretires, erionites, ferrierites, zeolites, ZSM5 and ZSM11, the mazzites and the cements such as for example those of the Secar type produced by Society Lafarge.

Preferably, a support is used which is chosen from the group consisting of carbon, activated carbon, coke, silica, the aluminas, the silica-aluminas, the silicates, the aluminates and the silico-aluminates (zeolitic for example).

Advantageously, the support is chosen from the group consisting of silica, the aluminas, the silica-aluminas, the silicates, the aluminates and the silico-aluminates and quite advantageously alumina is used.

When the mercury recovery masses are intended for use in the processing of charges containing hydrocarbons which are condensable (for example C4 or higher than C4) at a temperature situated within the range of temperature at which recovery is performed, it has been found that masses having a mean pore diameter at least equal to 100 Angstroms ($10^{-8}$ m) have increased stability.

The conditions of obtaining masses (or supports intended for the production of these masses) having a mean pore diameter of at least 100 Angstroms ($10^{-8}$ m) are sufficiently well known to a man skilled in the art that they do not need to be repeated here, within the framework of the present invention (see for example U.S. Pat. No. 4,094,777).

Usually, the preferred supports have a specific surface area of approx. 20 to 300 $m^2 \times g^{-1}$, these values not being limitative.

The incorporation of a copper compound other than a sulphide into a solid mineral dispersant or support may be carried out by any method known to a man skilled in the art, for example by mixture with a copper compound or by impregnation using a solution of a copper compound. The copper compounds which are normally used are compounds which are readily transformable into copper oxide at relatively low temperatures.

As an example of a copper compound, it is possible by way of non-limitative example to quote: the copper oxides; copper hydroxide $Cu(OH)_2$; the basic copper salts for example the carbonates to formulae $CuCO_3$, $Cu(OH)_2$ and $2CuCO_3$, $Cu(OH)_2$; the salts of these organic complexes of copper such as the salts of carboxylic acids, for example formiates, acetates, tartrates, citrates, benzoates, oxalates, malonates, succinates, glycolates, lactates and acetylacetonate and copper nitrate.

Normally, it is preferable to introduce the copper compound by impregnating the support with an aqueous or organic solution of a copper compound and preferably by means of an aqueous solution of a copper compound. Advantageously, an aqueous solution of copper nitrate is used.

Possibly one can introduce onto the support a small proportion of a soluble silver compound. The quantity of silver introduced into the support expressed by weight of silver in relation to the support normally represents from 0 to 5% by weight. Other metals may likewise be present, for example iron.

The solid mineral dispersant or support comprising a copper compound other than a sulphide is then possibly calcined in order at least partially to convert the copper compound to copper oxide. When in the stage (a) of introduction of a copper compound, a copper oxide is blended with the solid mineral dispersant or support, this calcination stage is not necessary.

During the course of this calcination stage, the working conditions are preferably so chosen that for the most part, that is to say at least 50%, and preferably at least 80% and very advantageously 100% of the copper compound present is converted to copper oxide (CuO). In fact, the Applicants have found that copper is particularly well fixed in the form of copper oxide. Calcination may be conducted in a neutral or in an oxidising atmosphere. Thus it is possible to work in the presence of an inert gas such as nitrogen, argon, helium or a mixture of these gases. It is likewise possible to work in the presence of a mixture of oxygen and inert gas containing for example 1 to 60% by weight of oxygen or even in the presence of substantially pure oxygen.

Calcination is preferably conducted in an oxidising atmosphere and advantageously air is used, but it is likewise possible to use air enriched with oxygen.

The calcination temperature is normally about 200° to about 1000° C. and is preferably about 300° to about 800° C. and even more advantageously 350° to about 600° C.

Calcination may be carried out in a static atmosphere or in a current of gas. Normally, it is preferable to work in a current of gas and advantageously a current of air is used. The spatial velocity per hour (VVH) expressed as a volume of gas per volume of recovery mass and per hour is normally approx. 100 to approx. 20,000 $h^{-1}$ and preferably about 100 to 10,000 $h^{-1}$ and often approx. 300 to 5000 $h^{-1}$.

This calcination stage normally lasts about half an hour to approx. 24 hours and preferably approx. half an hour to approx. 12 hours and even more advantageously from 1 hour to approx. 10 hours.

The product normally containing copper oxide originating from stage (a) or stage (b) of calcination is then brought into the presence of elementary sulphur at least partly in the form of an organic solution or even in the form of solid sulphur or even in the form of vapour, the sulphur condensing on the support during the course of the heat treatment; the product resulting from this incorporation (stage (c)) constitutes the precursor of the mercury recovery mass according to the present invention.

It is in particular possible to use as an organic sulphur solution particles of sulphur in the natent state or in the form of flowers of sulphur, the mean diameter being for example less than 20 microns and preferably comprised between 0.01 and 10 microns in solution at least partly and possibly also in suspension in an organic compound of which the boiling temperature is below 250° C. such as for example: toluene, benzene, methyl alcohol, acetone, carbon disulphide or any other organic compound known to a man skilled in the art in which sulphur is soluble and for example a light fuel boiling at between about 60° and 95° C., a hexane type fuel boiling between approx. 63° and 68° C., a so-called F type fuel boiling between approx. 100° and 160° C. (and containing by volume 10 to 20% of aromatic hydrocarbons) and a white spirit type of fuel boiling between 150° and 250° C. (and containing by volume 14 to 22% aromatic hydrocarbons).

The support is impregnated with the said organic solution, the total quantity of sulphur being introduced in one or possibly several operations of impregnation with intermediate drying at a temperature below 150° C. It is necessary to carry out this or these impregnation(s) while avoiding premature crystallisation of the sulphur on the support, particularly by virtue of there being too great a difference in temperature between the support and the organic impregnation solution. To achieve this objective, it may be advantageous firstly to heat the support to the same temperature as the impregnation solution.

The objective being to convert the copper oxide at least partly into copper sulphide, so reducing the elementary sulphur to $S^{--}$, it has likewise been discovered that this objective can be improved by adding to the said solution at least one reducing compound chosen for example from the group consisting of hydrogen, formaldehyde, acetaldehyde, formic acid, hydrazine etc.

The quantity of sulphur incorporated into the absorption mass is ideally chosen to allow subsequently the conversion of the copper compounds contained in the said mass at least partially into copper sulphide. The quantity of sulphur may easily be adjusted according to the quantity and stoichiometry of copper sulphide which it is desired to obtain.

It is normally desirable to convert all the copper compounds present in the absorption mass into copper sulphide and therefore use a quantity of sulphur calculated, in sulphur atoms, at least stoichiometric, in relation to the copper, or to the combination of copper and other metals present, particularly silver, calculated in atoms of metal and this, for their highest stable valency, for example $Cu^{2+}$, $Fe^{3+}$, $Ag^+$.

Calculated in atoms, the quantity of sulphur used is advantageously such that the atomic ratio of sulphur to active metals present in the mass is approx. 0.8:1 to 2:1 and preferably approx. 0.9:1 to 1.7:1. The term active metals is understood to refer to those which capture mercury, for example copper, silver, iron. It is likewise possible for example to introduce silver into the said mass particularly by incorporating a silver compound during stage (a) of the process.

The precursor resulting from stage (c) described above is then subjected in stage (d), referred to as the activation stage, to heat treatment in a non-oxidising atmosphere, for example a neutral or reductive and preferably neutral atmosphere, accompanied by a scavenging with gas, at a temperature and for a sufficient time to allow the formation of sulphide of the metal or metals present.

This heat-treatment is normally carried out under an inert gas current, for example a current of nitrogen, argon, helium or a mixture of two or more of these gases, or even water vapour in a proportion of less than 10% by volume and preferably less than 5% by volume and very preferably less than 1% by volume. To the said gas can be added 1 to 5% by volume of a reducing compound chosen for example from the group formed by hydrogen, formaldehyde, acetaldehyde, formic acid, etc. When water vapour is present, it may be advantageous to add hydrogen for example with a $H_2:H_2O$ ratio greater than 0.1% by volume.

In a preferred form of embodiment of this treatment, the absorption mass containing the sulphur and the copper oxide is treated in a current of inert gas at a temperature of approx. 100° to approx. 250° C. and preferably approx. 120° to 230° C. and often approx. 130° to 220° C. with a spatial hourly velocity (VVH) expressed in terms of volume of gas per volume of recovery mass and per hour, of approx. 100 to 10,000 $h^{-1}$ and preferably approx. 300 to 5000 $h^{-1}$ and often approx. 500 to 2000 $h^{-1}$. The period of this treatment accompanied by gas scavenging is normally approx. half an hour to approx. 24 hours and is preferably approx. half an hour to about 10 hours, a period of approx. 2 hours being normally sufficient.

During the course of the heat treatment, there is a chemical interaction between the copper oxide, possibly promoted by Ag, Fe and sulphur. A release of $SO_2$ is observed according to a possible reaction:

$$2CuO + 3S \rightarrow 2CuS + SO_2$$

When at least one reducing agent has been added to the sulphur during stage (c) the proportion of sulphur eliminated in the form of $SO_2$ may preferably be reduced as follows:

$$CuO + HCHO + S \rightarrow CuS + HCOOH$$

or even $$CuO + HCOOH + S \rightarrow CuS + CO_2 + H_2O$$

After the heat treatment (stage d) accompanied by gas scavenging, the absorption mass may possibly be dried, preferably in a current of inert gas, for example in a current of nitrogen, helium, argon or a mixture of two or more of these gases (in the presence or absence of a reducing compound such as that previously described) and then possibly cooled down to ambient temperature, preferably in the presence of the aforesaid current of gas, before being brought into contact with the fluid to be purified.

In another embodiment of the invention which does not constitute a preferred embodiment, it is finally possible to incorporate a stage (b') of reducing treatment following stage (b), in the event of the copper having been deposed by impregnation or at the end of stage (a) if a copper oxide has been added by wet mixture with a support (no calcination).

The reducing treatment then seeks to convert the copper oxide, possibly promoted by the silver or even by the iron, to metallic copper. Any industrial process known to a man skilled in the art may be utilised, for example in the presence of a gas containing hydrogen or even reduction in the presence of a chemical reducing compound such as for example aldehydes (for example formaldehyde, acetaldehyde), hydrogen (formic acid), as indicated hereinabove as an improvement to stage (c).

After reduction by at least 50% and preferably 70% and even more preferably 85% of the copper oxide to metal copper, and possibly the metal silver (iron if this is present being only partially reduced), the product obtained is brought into contact with elementary sulphur for example possibly at least partially in the form of an organic solution or without a solvent (stage (c)) after which it is dried and activated according to stage (d).

During the course of this stage, the sulphide forms then stoechiometrically for the metallic copper fraction:

$$Cu + S \rightarrow CuS$$

And as hereinabove for the fraction of copper in the oxide form:

$$2CuO + 3S \rightarrow 2CuS + SO_2$$

The recovery mass obtained at the end of stage (d) contains 8 to 25% by weight of copper sulphide and preferably approx. 10 to 20% and in an often advantageous form 12 to 18%. Usually, masses are preferred which have at least 60% and preferably at least 80% copper (by weight) in the sulphide state.

Structural analysis shows that the sulphide is at least partly in the form of CuS and generally the greater part of the sulphide is in this form.

Other sulphides may be present which have as their formula CxSy in which x, y represent a whole number between 1 and 10.

The mercury recovery masses obtained by the method according to the present invention may be used for purifying gases or even liquids which contain mercury, for example gas condensates. These solid masses are usually employed in the form of a fixed bed through which the fluid to be purified is passed.

The following examples illustrate the invention without limiting its scope.

EXAMPLE 1 (comparative)

1 kg autoclaved alumina balls of 170 $m^2 \times g^{-1}$ specific surface area and with a pore volume of 1.2 $cc \times g^{-1}$ is impregnated with 1.2 l of an aqueous solution containing 370 g trihydrated copper nitrate $Cu(NO_3)_2, 3H_2O$.

The alumina balls thus impregnated are dried and calcined for 7 hours at 400° C. in a current of air with a VVH of 5000 h$^{-1}$. So-called basic balls are obtained for the experiment to be continued. The resultant balls are in another stage not in accordance with the invention impregnated with a dredger using 1 l containing 0.52 l of water and 0.48 l of a 20% aqueous solution of ammonium sulphide, the percentage being by weight. The excess sulphur is eliminated by drying in an oven at 200° C. for 10 hours in a current of nitrogen (VVH 5000 h$^{-1}$).

The mass A obtained contains copper sulphide in a quantity of 15% in relation to the weight of the mass. Analysis by X-ray defraction indicates that all the copper is in the form of copper sulphide. Chemical analysis shows that the atomic ratio of Cu:S is equal to 1.

EXAMPLE 2

Exactly as in the previous example, 1 kg of autoclaved alumina balls 170 m$^2 \times$g$^{-1}$ of specific surface area and with a pore volume of 1.2 cc$\times$g$^{-1}$ is impregnated with 1,2 l of an aqueous solution containing 300 g trihydrated copper nitrate. The alumina balls thus impregnated are dried and calcined for 7 hours at 400° C. in a current of air at a VVH of 5000 h$^{-1}$.

Then, the procedure according to the invention is performed: the balls thus obtained (and referred to as basic) are preheated to 70° C. and then in another stage, corresponding to stage (c) of the invention) they are impregnated with an organic mixture of sulphur containing 90 g micronised sulphur the particles of which have a mean diameter of 2 microns, partially solubilised in 1.1 l of toluene at 70° C., impregnation being carried out in one single operation, under heat on the support which is preheated to 70° C.

The product is then dried at 120° C. to eliminate the major part of the solvent (which is condensed and then recycled). And then at 200° C. (heat treatment of stage (b) of the invention) for 10 hours in a current of nitrogen. It is observed that SO$_2$ is released.

The mass B obtained contains 15% copper sulphide, as the mass A. Analysis by X-ray defraction shows that all the copper is combined in the form of copper sulphide CuS. Chemical analysis shows that the atomic ratio of Cu:S is equal to 1.

EXAMPLE 3

The way the mercury recovery mass is prepared is exactly as in the second example, the aqueous solution containing 370 g trihydrated copper nitrate being replaced by 365.3 g trihydrated copper nitrate and 3.36 g silver nitrate.

The mass C obtained contains 15% copper sulphide plus silver sulphide as the masses A and B previously described. X-ray defraction analysis shows that all the copper and all the silver in the mass C are in the form of a sulphide.

EXAMPLE 4

The mercury recovery masses A, B and C obtained in the preceding examples are tested under the following conditions. The apparatus consists of a tubular metal reactor of which the inactivity for fixing mercury has been monitored. Into this reactor are introduced 30 ml of the recovery mass to be tested and a stream of natural gas containing mercury is passed through at a temperature of 50° C. at a pressure of 40 bars (4 MPa) at a VVH of 15,000 h$^{-1}$ (TPN, temperature and pressure normal), in other words at a rate of flow of 450 l$\times$h$^{-1}$.

The volumetric composition of the natural gas to be cleansed is 84% CH$_4$, 0.6% hydrocarbons having 5 and more carbon atoms in their molecule, the balance consisting of a mixture N$_2$, CO$_2$, C$_2$H$_4$, C$_3$H$_8$ and C$_4$H$_{10}$. The mercury content in the gas at the intake to the reactor is 4500 g/Nm$_3$ (TPN).

The quantity of mercury remaining in the gases after purification is assessed by a method which employs the principle of the variation in resistivity of a gold foil amalgamated by mercury.

The efficiency of the recovery masses is defined by the following equation.

$$E \% = \frac{(\text{Hg content at intake}) - (\text{Hg content of outlet}) \times 100}{(\text{Hg content at intake})}$$

The so-called "initial" efficiency is determined after 10 hours operation under the above-mentioned conditions.

Measurements are then taken at the end of 500, 1000 and 1500 hours' operation under the abovedescribed working conditions.

The results are set out in Table I hereinafter: they show that the masses obtained by the method according to the present invention are very effective and moreover that their long-term life is greater than that of the comparison mass A.

EXAMPLE 5

The starting product for the following tests are so-called basic balls prepared in Examples 1, 2 and 3.

All tests were conducted on a basis of these balls.

It will be recalled that the method developed according to the invention embodies a plurality of alternatives, the basic pattern being as follows:

Mixture of the support charged with copper oxide (that is to say the so-called basic balls) with elementary sulphur in powder or granule form.

Heat treatment of the mixture at between 140° C. and 150° C. in an inert atmosphere, for example water vapour or nitrogen.

Possible additional treatment by impregnation of the resultant product with dilute formic acid.

Possibly final heat treatment (between 140° and 50° C.) an inert atmosphere of nitrogen or water vapour.

TABLE I

| Time: | mass A | | mass B | | mass C | |
| --- | --- | --- | --- | --- | --- | --- |
| | residual mercury g/Nm$^3$ | efficacy % | residual mercury g/Nm$^3$ | efficacy % | residual mercury g/Nm$^3$ | efficacy % |
| 10 h | 1 | 99.98 | 0.6 | 99.987 | 0.4 | 99.991 |
| 500 h | 0.8 | 99.982 | 0.3 | 99.993 | 0.3 | 99.993 |
| 1000 h | 1 | 99.978 | 0.4 | 99.991 | 0.2 | 99.996 |
| 1500 h | 1.2 | 99.973 | 0.5 | 99.988 | 0.2 | 99.996 |

Note:
a) When two final stages are carried out before the two first stages, substantially the same results are obtained.
b) Also, similar results are obtained by simultaneously performing certain stages and particularly by keeping to the following pattern:

Mixture of the support charged with copper oxide (that is to say the so-called basic balls) with elementary sulphur and simultaneous impregnation with dilute formic acid.

Heat treatment of the resultant mixture at 140° to 150° C. in an inert gas, particularly nitrogen.

c) Also, results of the same magnitude are obtained by the following method:

The support charged with copper oxide is treated with a reducing agent.

The support obtained and charged with copper is treated with elementary sulphur.

Heat treatment under an inert gas, particularly nitrogen, at between 200° and 220° C.

Heat treatment at a temperature greater than 200° C. makes it possible to eliminate the melting loss at 200° C. so that all the copper is converted to copper sulphide.

Two industrial tests were also carried out:

Charged with copper oxide, the support (so-called basic balls) is carefully mixed with elementary sulphur having a granulometry of between 0.5 and 1 mm, originating from the Industrial Sulphur Company, The mixture thus obtained is treated in a rotary steamer for two hours in a nitrogen atmosphere (industrial test N2) while a second test was performed under water vapour (industrial test H20) under the above working conditions.

Table II hereinafter summarises all the results.

The catalyst was then treated under nitrogen (or water vapour) at 140°-150° C. in a Louisville type furnace.

The results are identical to those obtained under laboratory conditions.

EXAMPLE 7

The following tests were then conducted (in the laboratory):

impregnation of the support charged with copper oxide (so-called basic balls) by a solution of dilute formic acid. The quantity of formic acid used is the stoichiometric quantity;

treatment at 140°-150° C. under nitrogen or water vapour;

mixture of the resultant product containing metallic copper with elementary sulphur;

heat treatment at 140°-150° C. under nitrogen or water vapour.

The results are identical to the preceding tests, that is to say the initial copper oxide is entirely converted to copper sulphide.

The method of preparation of the mercury recovery mass according to the present invention, in addition to producing a solid mass with a better long-term life, likewise has the following main advantages:

TABLE II

TABLE OF RESULTS

| | PROCESSES | | | | | | |
|---|---|---|---|---|---|---|---|
| | Comparative catalyst treated by (NH4)2S—N2 | Comparative catalyst treated by (NH4)2S—H2O | N2 (140–150) | H2O (140–150) | Indust. H2O (140–150) | Indust. N2 (140–150) | N2 (220) |
| Total S (% wt) | 6.62 | 6.4 | 8.7 | 5.8 | 6.2 | 7.2 | 5.3 |
| S as sulphides $S^{2-}$ (% wt) | 5.71 | 4.86 | 6.2 | 3.2 | 3 | 6 | 5.02 |
| S as sulphate $SO_4$ (% wt) | 0.005–0.2 | 0.6–0.5 | 0.85–0.6 | 1.26 | 1.86 | 0.5 | 0.2 |
| Melting losses ML under N2 at 200° C. (% wt) | 1.51 | 3.15 | 0.5 | 2.8 | 3 | 1 | 0 |
| (1) | CuS | CuS | CuS + CuO | CuS + CuO | CuS + CuO | CuS + CuO | CuS |

Note: (1) Presence of CuS and/or CuO - analysis by X-ray defraction.

EXAMPLE 6

Analyses by X-ray defraction show that the copper oxide is not entirely converted to copper sulphide during heat treatment at 140°-150° C. Only half the oxide was converted.

A. To complete this conversion, the following test was conducted:

1) The catalyst obtained after mixture with sulphur and heat treatment under nitrogen (or water vapour) was impregnated with a mixture containing 15% formic acid. All the pore volume, in other words approx. 60 cc per 100 g of catalyst, was impregnated.

2) The catalyst thus impregnated was treated at 140°-150° C. under nitrogen (or water vapour).

The results by X-ray defraction analysis are conclusive: all the copper oxide was converted to copper sulphide.

B. This treatment was applied on an industrial scale under the following conditions:

The catalyst was impregnated to 20% of its pore volume with a solution of 20% formic acid, in other words 120 l of dilute formic acid per tonne of catalyst.

Possibility of incorporating the sulphuration agent at a relatively low temperature, usually below 100° C.

Possibility of converting the precursor of the mercury and/or arsenic recovery mass resulting from the incorporation of the elementary sulphur, in an active recovery mass, at a relatively low temperature, usually below 250° C.

Use of a non-toxic sulphuration agent which has no unpleasant smell.

We claim:

1. In a solid mercury recovery mass comprising a solid mineral aluminous dispersant or support, and copper and sulfur at least partly in the form of copper sulfide, the improvement comprising an improved long-term life of the recovery mass resulting from the production of the mass by the following stages:

(a) incorporating at least one copper compound other than a sulfide into a solid mineral aluminous dispersant or support, (b) when said copper compound in step (a) is not a copper oxide, calcining the product obtained in stage (a) so as to convert at least in part the copper compound(s) which it contains into copper oxide (CuO and/or $Cu_2O$), (c) bringing the product obtained in stage (b) or in stage (a) when there has not been a stage (b) into contact with elemental sulfur, and (d) subjecting the product resulting from stage (c) to a heat treatment in a non-oxidizing atmosphere at a temperature and for a time sufficient to convert at least 80% of the copper to the sulfide state.

2. A mass according to claim 1, wherein in in stage (c) the elemental sulfur is used at least partly in solution in an organic solvent.

3. A solid mass according to claim 1, wherein the copper sulfide is about 8 to 25% by weight of the weight of said mass and in which the atomic ratio S:Cu is from 0.8:1 to 2:1.

4. A solid mass according to claim 1, wherein the solid mineral dispersant or support is selected from the group consisting of alumina, a silica-alumina, and an aluminate.

5. A mass according to claim 1, wherein in stage (d), the heat treatment is conducted in an atmosphere of at least one inert gas containing not more than 10% by volume of water vapor.

6. A mass according to claim 1 wherein in stage (a), an aqueous solution of copper nitrate is used.

7. A solid mass according to claim 1, wherein in stage (b) the product resulting from stage (a) is calcined at a temperature of 200°–1000° C. in a current of gas at a VVH of about 100 to approx. 20,000 $h^{-1}$ for approx. half to approx. 24 hours.

8. A solid mass according to claim 1, wherein in stage (c), the product resulting from stage (b) is impregnated with an organic solution of sulphur or with sulphur in the solid state or with sulphur in the vapour state, condensed on the support.

9. A solid mass according to claim 1, wherein in stage (c), the elemental sulfur is used in solution in at least one organic solvent selected from the group consisting of toluene, benzene, methyl alcohol, acetone, carbon disulfide, a light fuel boiling between about 60° and 95° C., hydrocarbon fuel boiling between about 100° to 160° C. and containing by volume 10 to 20% aromatic hydrocarbons and a white spirit fuel boiling between about 150° and 250° C. and containing by volume 14 to 22% aromatic hydrocarbons.

10. A solid mass according to claim 1, wherein the atomic ratio of (A) sulfur to (B) copper is about 0.8:1 to 2:1.

11. A solid mass according to claim 10, in which the said atomic ratio is about 0.9:1 to 1.7:1.

12. A solid mass according to claim 4, wherein in stage (c), the inert gas contains 1–5% of a reducing agent.

13. A solid mass according to claim 1, wherein an intermediate stage (b') is incorporated between stage (c) and either stage (b) or stage (a) when there has not been a stage (b), said intermediate step (b') comprising subjecting the respective product from stage (a) or (b) to a reducing treatment to convert at least 50% of copper oxide present in the product to elemental metal.

14. A solid mass according to claim 13, in which the reducing treatment is performed with hydrogen, an aldehyde, formic acid or hydrazine.

15. A mass according to claim 5 in which 1 to 5% by volume of hydrogen is added to the said gas.

16. A mass according to claim 15, wherein said gas comprises water vapour and hydrogen at a ratio $H_2:H_2O$ of more than 0.1% by volume.

17. A solid mass according to claim 1, in which the heat treatment of stage (d) is carried out at a temperature of about 100° to 250° C. with a gas VVH of about 100 to 10,000 $h^{-1}$ and for about half to 24 hours.

18. A solid mass according to claim 17, in which the heat treatment is carried out at between 120° and 230° C., 19. A solid mass prepared according to claim 1 in which a silver compound is also incorporated during the course of stage (a).

* * * * *